United States Patent
Singh et al.

(10) Patent No.: US 10,217,359 B2
(45) Date of Patent: Feb. 26, 2019

(54) SYSTEM OF CORRELATED VIDEO AND LIGHTING FOR PARKING MANAGEMENT AND CONTROL

(71) Applicant: Echelon Corporation, Santa Clara, CA (US)

(72) Inventors: Shalender Singh, Milpitas, CA (US); Sohrab Modi, Oakland, CA (US)

(73) Assignee: Echelon Corporation, Santa Clara, CA (US)

( * ) Notice: Subject to any disclaimer, the term of this patent is extended or adjusted under 35 U.S.C. 154(b) by 117 days.

(21) Appl. No.: 15/298,496

(22) Filed: Oct. 20, 2016

(65) Prior Publication Data
US 2018/0114437 A1 Apr. 26, 2018

(51) Int. Cl.
*G08G 1/14* (2006.01)
*G06Q 30/02* (2012.01)
(Continued)

(52) U.S. Cl.
CPC ......... *G08G 1/142* (2013.01); *G06K 9/00711* (2013.01); *G06K 9/00771* (2013.01);
(Continued)

(58) Field of Classification Search
None
See application file for complete search history.

(56) References Cited

U.S. PATENT DOCUMENTS 6,305,602 B1 * 10/2001 Grabowski .......... H03K 17/945
235/379
6,917,307 B2 * 7/2005 Li ............................ G08G 1/14
194/902

(Continued)

FOREIGN PATENT DOCUMENTS

KR 20100086089 7/2010
WO WO 2003000520 1/2003
(Continued)

OTHER PUBLICATIONS

English translation of Kang, KR-2010-0086089.*
(Continued)

*Primary Examiner* — Mohammad J Rahman
(74) *Attorney, Agent, or Firm* — Locke Lord LLP

(57) ABSTRACT

A parking management system includes a parking facility management controller configured to allocate parking spaces at a parking facility as at least one of customer reserved spaces, handicap spaces, electric vehicle station spaces, premium spaces or unreserved spaces, the controller further including a communications unit configured to transmit the allocation of parking spaces to at least one video unit located at the parking facility. The video unit located at the parking facility, includes a video camera and video frame processing logic to process a video stream from the video camera while monitoring a parking space allocated by the controller, identify an event occurring at the allocated parking space, and encode a low bandwidth message characterizing the event. The at least one video unit includes a communications unit configured to transmit the low bandwidth message over low bandwidth communication links to the management controller.

17 Claims, 13 Drawing Sheets

(51) Int. Cl.
*H04N 7/18* (2006.01)
*G06K 9/00* (2006.01)
*H04N 7/10* (2006.01)
*H05B 37/02* (2006.01)
*G06K 9/66* (2006.01)
*G08G 1/015* (2006.01)
*G08G 1/017* (2006.01)
*G08G 1/04* (2006.01)

(52) U.S. Cl.
CPC ........... *G06K 9/00993* (2013.01); *G06K 9/66* (2013.01); *G06Q 30/0206* (2013.01); *G08G 1/015* (2013.01); *G08G 1/0175* (2013.01); *G08G 1/04* (2013.01); *G08G 1/144* (2013.01); *G08G 1/146* (2013.01); *H04N 7/183* (2013.01); *H05B 37/0263* (2013.01); *G06K 2009/00738* (2013.01); *G06K 2209/15* (2013.01); *G06K 2209/23* (2013.01)

(56) References Cited

U.S. PATENT DOCUMENTS

| | | | |
|---|---|---|---|
| 7,123,166 | B1 | 10/2006 | Haynes et al. |
| 7,466,223 | B2 | 12/2008 | Sefton |
| 9,330,570 | B2 | 5/2016 | Wang et al. |
| 2006/0170770 | A1 | 8/2006 | MacCarthy |
| 2007/0069921 | A1 | 3/2007 | Sefton |
| 2009/0231429 | A1 | 9/2009 | Hardee et al. |
| 2009/0315738 | A1 | 12/2009 | Falk et al. |
| 2010/0265100 | A1 | 10/2010 | Jalbout et al. |
| 2010/0296704 | A1 | 11/2010 | Hampapur et al. |
| 2013/0268654 | A1 | 10/2013 | Abraham et al. |
| 2014/0046874 | A1 | 2/2014 | Li et al. |
| 2014/0249742 | A1 | 9/2014 | Krivacic et al. |
| 2015/0009048 | A1 | 1/2015 | Wang et al. |
| 2015/0077559 | A1 | 3/2015 | Wu |
| 2015/0154669 | A1 | 6/2015 | Wu et al. |
| 2015/0177722 | A1* | 6/2015 | Chan ............... G05B 15/02 700/275 |
| 2016/0050397 | A1* | 2/2016 | Di Giamberardino ............... H05B 37/0227 315/149 |
| 2016/0094399 | A1 | 3/2016 | Kish |
| 2016/0300489 | A1 | 10/2016 | Shafran |
| 2018/0047288 | A1* | 2/2018 | Cordell ............... B60Q 9/008 |

FOREIGN PATENT DOCUMENTS

| | | |
|---|---|---|
| WO | WO 2014145270 A1 | 9/2014 |
| WO | WO 2016030854 | 3/2016 |
| WO | WO 2016048428 | 3/2016 |

OTHER PUBLICATIONS

English translation of Sheng, CN102117550 (A).*
Tang, Vanessa WS, Yuan Zheng, and Jiannong Cao. "An intelligent car park management system based on wireless sensor networks." Pervasive Computing and Applications, 2006 1st International Symposium on. IEEE, 2006.
Pala, Zeydin, and Nihat Inanc. "Smart parking applications using RFID technology." RFID Eurasia, 2007 1st Annual. IEEE, 2007.
Lin, Sheng-Fuu, Yung-Yao Chen, and Sung-Chieh Liu. "A vision-based parking lot management system." Systems, Man and Cybernetics, 2006. SMC'06. IEEE International Conference on. vol. 4. IEEE, 2006.
International Search Report for PCT/US2017/057337 dated Jan. 8, 2018.

* cited by examiner

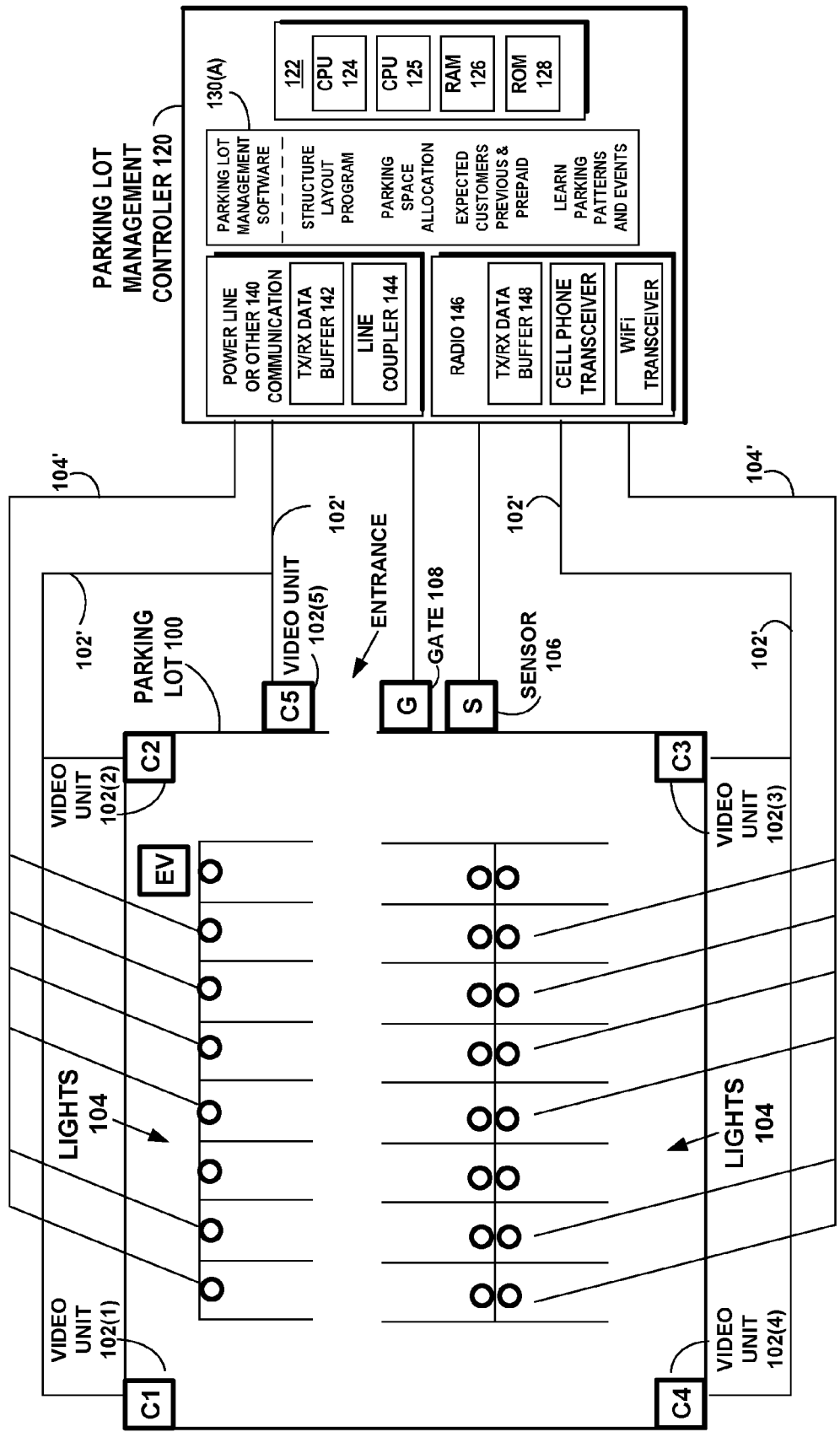
FIG. 1A  PARKING STRUCTURE INITIALIZATION

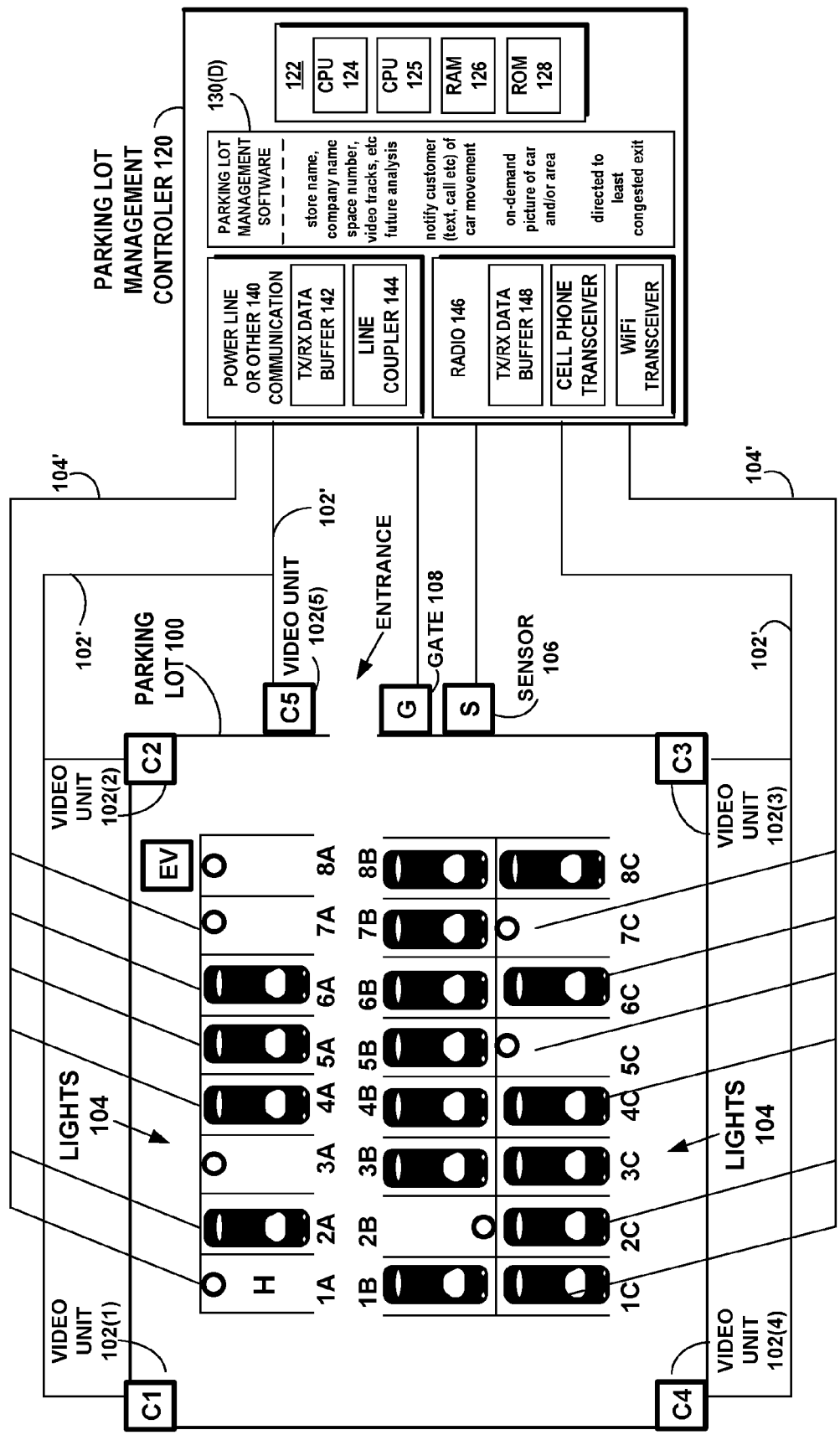

VIDEO UNIT 102(1)

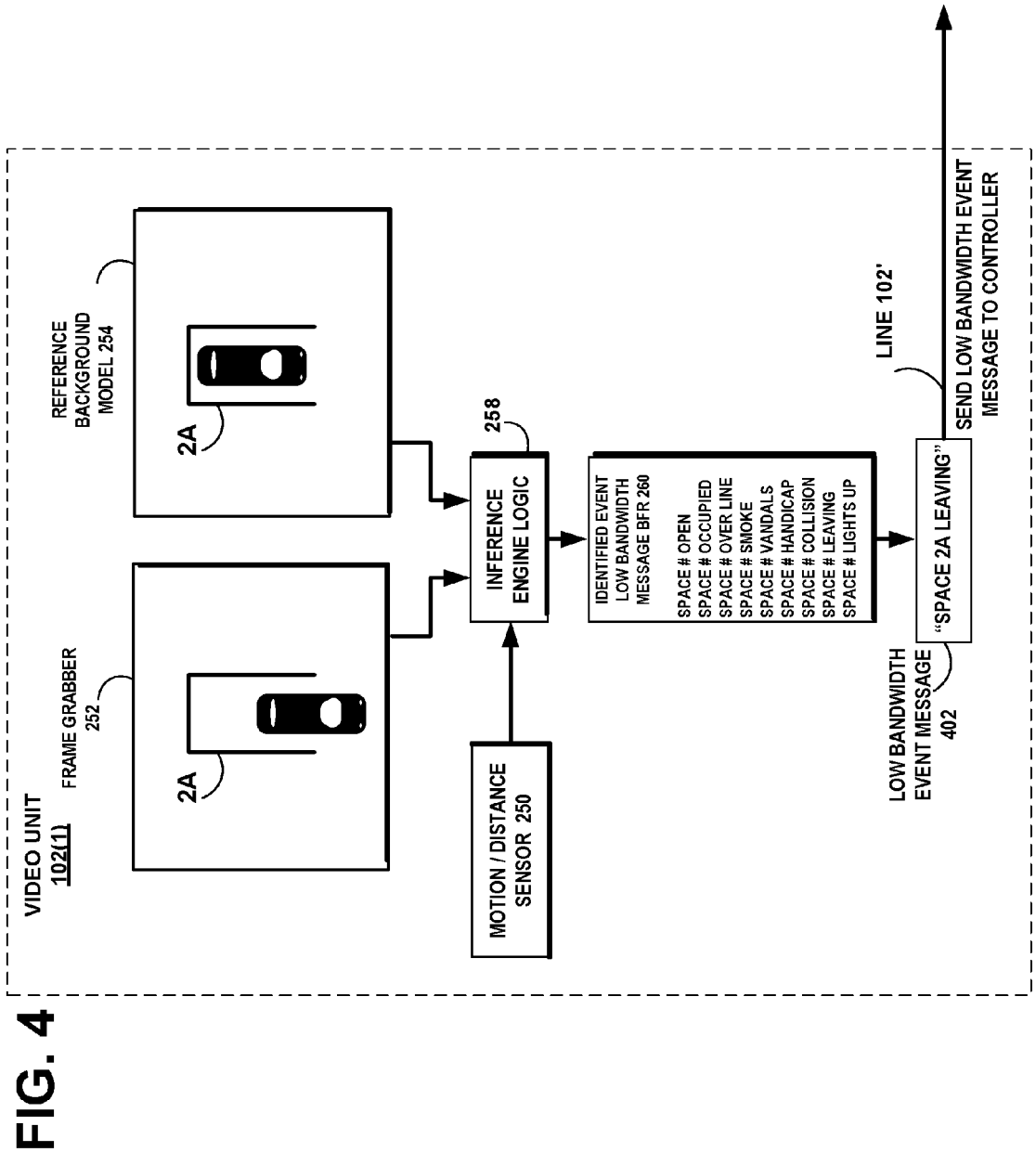

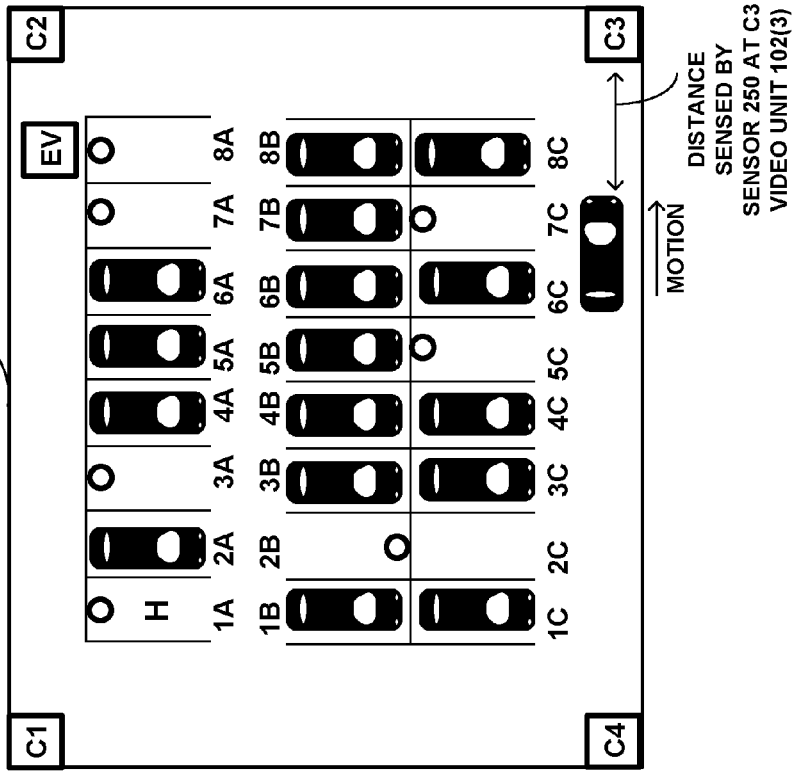
FIG. 4B
FIG. 4B'
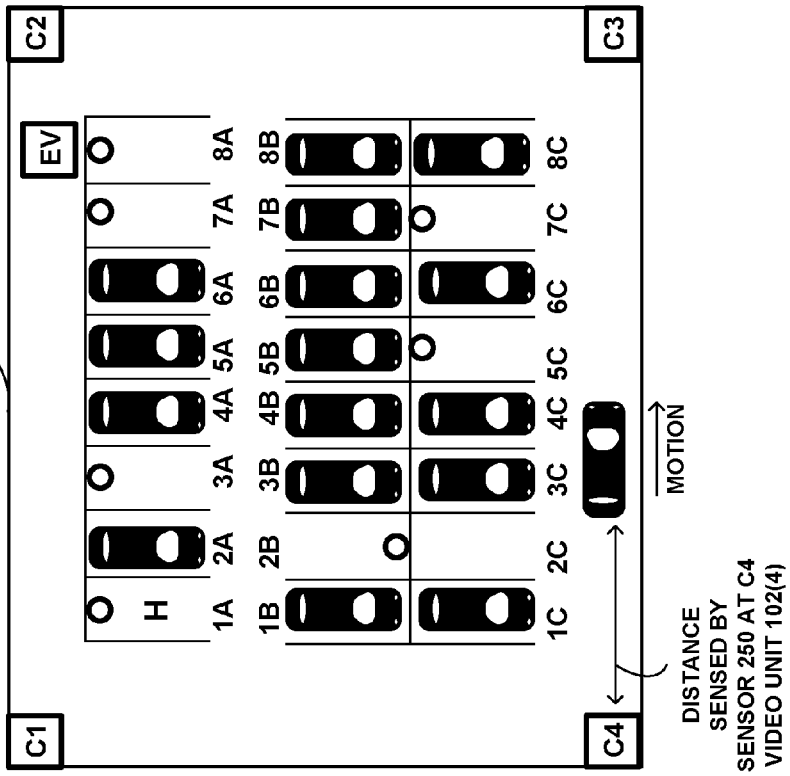
FIG. 4A
FIG. 4A'

SYSTEM OF CORRELATED VIDEO AND LIGHTING FOR PARKING MANAGEMENT AND CONTROL

FIELD OF THE INVENTION

The invention disclosed broadly relates to parking management and control, and more particularly relates to video and lighting for parking management and control.

BACKGROUND OF THE INVENTION

Parking is a key component of any transportation system. Parking needs must be address between businesses, residences and government entities in a collaborative manner. Parking is loaded with frustration for all parties involved. Any parking situation is a complex combination of problems such as the uncoordinated usage of either a single parking structure, multiple parking structures or on-street parking or both, the lack of timely and accurate information for motorists, hidden or unknown parking spaces, parking space occupancy, parking space categories, illegally (hazardously) parked cars, inefficient use of parking capacity, lack of dynamics to meet changing needs, inconvenient pricing methods, spillover accommodation, poor lighting, excessive energy usage, handicap spaces, expansion etc. Most of these problems are very hardware centric and expensive to remedy. Others require even more costly infrastructure changes to support any existing or new solution. Finally when a driver enters parking structures they are further inhibited because there is no way to access any parking solution functions.

One way to provide novel inexpensive solutions to parking problems is to include the use of cooperative lighting along with access to parking structure customer management functions and derived information from video sensors (and other sensors) within the parking facility. Lighting is always important because it influences the perception of security and safety in a facility. So you can pretty much count on lighting being present at parking facilities. Converting the lighting to assist with driver guidance is a start. Also using the existing lighting infrastructure in combination with video sensors (and other sensors) can alleviate many of the parking problems frustrating local government, motorists and parking facility owners.

Increasingly we see simple scalar sensors being utilized to bring some relief. But parking structures that employ these sensors find they are usually locked into particular solutions because sensors are expensive to deploy and typically tied one-to-one to each individual parking slot. They are also hard to install, not flexible, unintelligent and not easily re-purposed as needs change.

Another ongoing problem with deploying sensors, in general, is the appetite for information and the usage of communication facilities is always growing as parking structures evolve to become "smart". This is because sensor technology is evolving from reporting simple scalar counts to more complex classification technology while feeding into smart parking management systems (for smart cities) as part of the expanding role of the Internet of Things (IoT) in everyday lives. Reporting activities in parking structures (such as counting vehicles, people in vehicles, types of vehicles etc.) is adding to the class of "killer applications" that will greatly assist in driving IoT deployments.

The ability to monitor for events and count activities is at the core of parking management. The dynamic nature of parking structures due to random driver behavior makes this monitoring and counting problem difficult. The constant collection of real time meta data regarding the total number of parking spaces at a facility, the number of handicapped and EV spaces, illegally parked vehicles etc. and the total occupancy of each category is key to achieving the most efficient parking structure management. Developing increasing dynamic aspects of parking structure management that is able to not only adapt lighting for energy savings and driver guidance, but to also reconfigure metadata collection as well as create parking space assignments on the fly, for example to create new handicapped spaces on demand etc., will be the next step in this evolution.

Metadata counts (a set of data that describes and gives information about other data) from simple sensors today are being expanded to provide live video streams. It's amazing what a camera can do when joined up with sensors and sophisticated software. Due to Moore's Law, processing has become very inexpensive compared to the cost of massive sensor and video transmission infrastructures supporting a large and growing number of sensor and video feeds. The key problem is to mine the information embedded into the video data and intelligently combine it with other sensor data. This allows the generation of much more efficient and compact metadata and not needlessly move raw video data around an energy and capacity constrained network. Instead, because of economic trends it is possible to attach programmable processors to the data collection points to reduce data volumes and manage the energy needed to power the network sensors/nodes to provide the highest monitoring coverage and assistance to parking space seeking drivers.

Correlating video and sensor data at the network edge to assist with parking issues is also an unsolved problem. Data collected by today's rudimentary sensor networks have simple scalar forms with minimal information which makes processing simple (typically simple calculations of addition, subtraction, division, sums, and averages for example are generated). It is difficult to form a comprehensive understanding of a dynamic environment based on simple scalar information. On the other hand, videos and images collected by video sensor networks are rich information but have complicated forms. They are sometimes compressed and sent to back-end servers to be processed (formatted, integrated, and analyzed.) to meet diverse application requirements.

Increasingly, new applications cannot be supported by typical scalar sensor networks because they require vast amounts of information which can only be obtained from an image or video. This is also true for the evolution of parking management solutions. Scalar data is insufficient for many applications such as combining video surveillance, traffic monitoring and smart parking management.

Using the installed power lines to transmit data in a parking structure avoids the difficulty and costs of running separate data connections or video feeds throughout the concrete and steel structure. But, transmitting data over noisy low speed power lines is difficult. The main problem is how to represent uncompressed, live stream video data over any communication media, such as power lines, operated as low bandwidth communication links. Other examples of low bandwidth communication links experiencing the problem of how to represent uncompressed, live stream video data, include twisted pair, coax cable, Ethernet, radio media such s WiFi, Bluetooth, cellular, IEEE 802.15.4 RF at longer distances, and ultra-narrow band/Low Power Wide Area Network communications like LoRa. Also, any noise or interference-impaired communications medium will run slowly as it contends with resulting transmission errors. Bandwidth usage is also a problem for most forms of communication media in situations where many sensors and video units may be communicating at the same time.

SUMMARY OF THE INVENTION

Example embodiments of the invention, solve the problem of how to represent uncompressed, live stream video data over low bandwidth communication links. Example low bandwidth communication links may have a data rates of a few kilobytes/second. A video unit includes video frame processing logic that processes uncompressed, live stream video data to identify events occurring in parking spaces to be monitored. The video unit is configured to encode a low bandwidth message characterizing the identified event and to transmit the low bandwidth event message to a management controller over low bandwidth communication links.

In accordance with example embodiments of the invention, a parking management system includes a parking facility management controller having a processor and memory including computer program code configured to cause the management controller to allocate parking spaces at a parking facility. The parking facility may be an outdoor parking lot, a parking garage, or multiple parking garages. The allocations are at least one of customer reserved spaces, handicap spaces, electric vehicle (EV) station spaces, or unreserved spaces. The management controller further includes communications equipment configured to transmit the allocation of parking spaces to at least one video unit located at the parking facility.

At least one video unit located at the parking facility includes a video camera, video frame processing logic, a processor and memory including computer program code. The video unit is configured to cause the video frame processing logic to process a video stream from the video camera while the video camera is monitoring a number of parking spaces allocated by the management controller, and to identify an event occurring at any of the allocated parking spaces. The video unit is configured to encode a low bandwidth message characterizing the identified event. The video unit may include a power line or other medium communication units configured to transmit the low bandwidth event message over installed power lines or other medium to the management controller. In an alternate embodiment, the low bandwidth event message may also be transmitted by WiFi, cellular or any other radio communication technology.

A power line communications unit is included in the management controller, configured to receive the low bandwidth event message over installed power lines from the video unit. The power line communications unit also allows data communications over installed power lines to lights or other areas of parking structures where power is needed and control desired. The same power lines may be utilized to send control commands to light fixtures, signs, and other lighting devices, to turn on lights along a path from an entrance of the parking facility to the parking space allocated by the management controller. In an alternate embodiment, other examples of the low bandwidth communication include twisted pair, coax cable, Ethernet, Infrared, RFID, WiFi, Bluetooth, Bluetooth Low Energy, Sigfox, LTE-M, any Low Power Wireless Area Network (LPWAN) protocol, any machine to machine (M2M) communication protocol, cellular, IEEE 802.15.4 RF, or LoRa Low Power Wide Area Network.

At least one video unit further is configured to sense distance and motion for a vehicle by means of a sensor located at the video unit and to prepare a low bandwidth event message representing the vehicle's position and motion. The parking facility management controller is configured to receive the low bandwidth event message and to track the vehicle as it moves in the parking facility.

At least one video unit is further configured to identify the event occurring at the allocated parking space as the allocated parking space as being available or occupied, and transmit the low bandwidth event message to the management controller indicating the identified event.

The management controller is further configured to assign an alternate parking space in the parking facility, in response to receiving the low bandwidth event message indicating that the allocated parking space has become occupied.

At least one video unit is further configured to identify the event occurring at the allocated parking space as a parked vehicle leaving the allocated parking space, and transmit the low bandwidth event message to the management controller indicating that event.

The power line or other medium communications unit included in the management controller, is configured to turn on lights in the parking facility along a path from the parking space allocated by the management controller to a least congested exit of the parking facility, in response to receiving the low bandwidth event message indicating that the parked vehicle is leaving the allocated parking space.

The management controller is further configured to perform dynamic pricing of the parking spaces in the parking facility, the pricing being a function of availability, quality (cover from rain, sun, etc.) and convenience of the spaces.

The management controller is further configured to learn parking patterns of vehicles parking in the parking facility over time and revise the allocation of parking spaces for at least one of customer reserved spaces, handicap spaces, electric vehicle (EV) station spaces, or unreserved spaces in response to learned parking patterns.

A sensor proximate to an entrance of the parking facility, is configured to detect an approach of a vehicle and transmit a signal indicting the approaching vehicle. A video unit located proximate to the entrance of the parking facility, is coupled to the sensor and the management controller, and is configured to capture the license plate number (or an identifying sticker on the windshield or some other means of identification) of the approaching vehicle in response to the signal from the sensor and transmit the license plate number or parking sticker information, etc., to the management controller. The management controller is further configured to determine if the vehicle entering the parking facility displays a number or identity associated with a previous or prepaid customer name, if the vehicle bears a handicap symbol, if there is an indication that the vehicle is an electric vehicle, or if the vehicle indicates a new customer.

DESCRIPTION OF THE FIGURES

FIG. 1A illustrates an example embodiment of the invention, wherein a parking lot management controller allocates parking spaces at a parking lot.

FIG. 1D illustrates an example embodiment of the invention shown in FIG. 1C, wherein the at least one video unit is configured to identify an event of a parked car leaving the allocated parking space, and transmit the low bandwidth message to the management controller indicating the event. The communications unit in the management controller, is configured to turn on lights along a path from the parking space allocated by the management controller to a least congested exit of the parking lot, in response to receiving the low bandwidth message indicating that the parked car is leaving the allocated parking space.

FIG. 4 illustrates a more detailed view of the video unit of FIG. 2, wherein an event is identified currently occurring at the allocated parking space. The video unit is shown encoding a low bandwidth message characterizing the event. The video unit is shown transmitting the low bandwidth message to the management controller.

FIG. 4A illustrates distance and motion sensing for a car at a first position in the parking lot. FIG. 4A' illustrates the low bandwidth event message for the car at the first position of FIG. 4A.

FIG. 4B illustrates distance and motion sensing for a car at a second position in the parking lot. FIG. 4B' illustrates the low bandwidth event message for the car at the second position of FIG. 4B.

DISCUSSION OF THE PREFERRED EMBODIMENTS

Figure 1B:
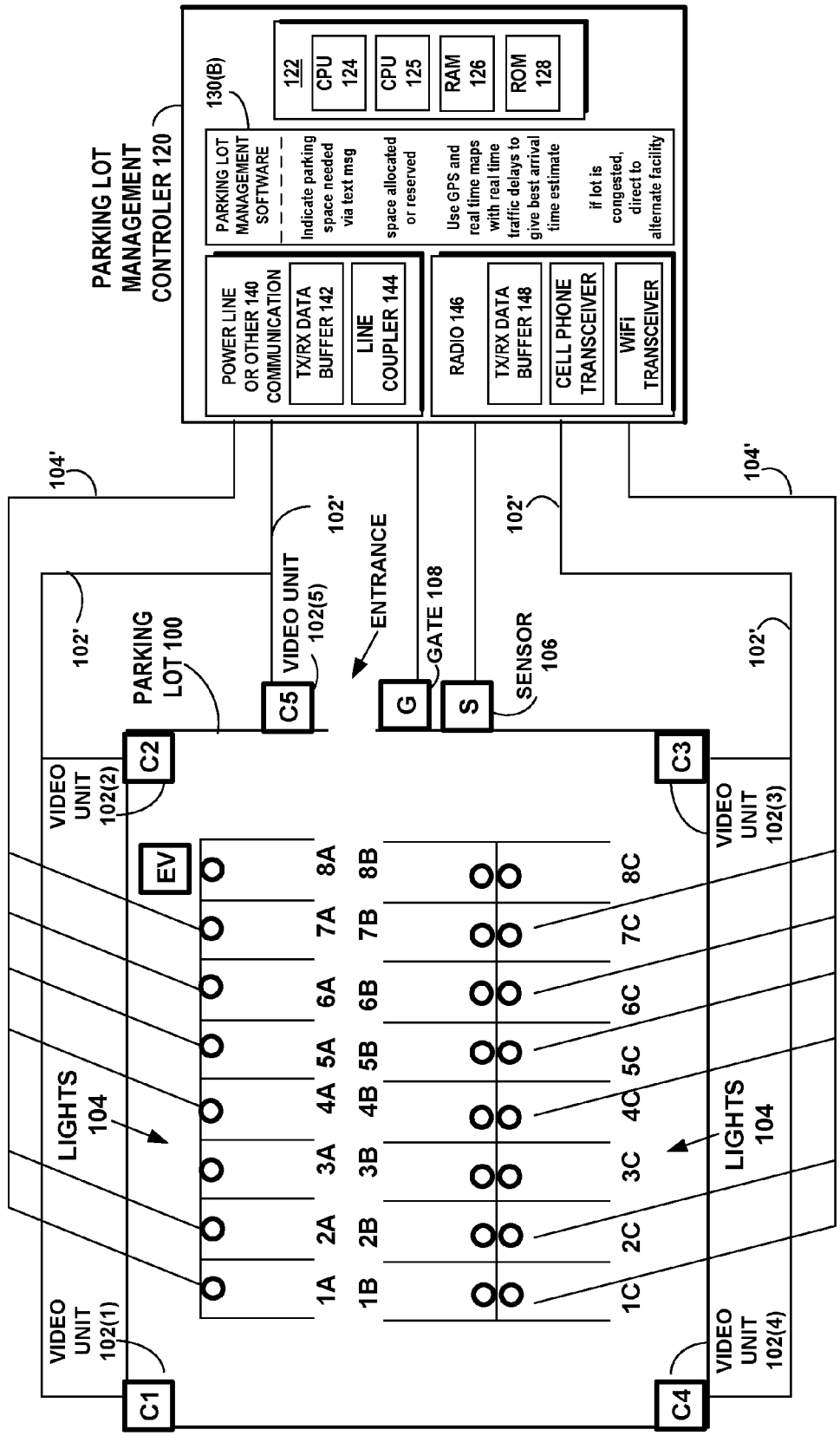
FIG. 1B illustrates an example embodiment of the invention shown in FIG. 1A, wherein the allocations are at least one of customer reserved spaces, handicap spaces, electric vehicle station spaces, or unreserved spaces. The management controller further includes communications equipment configured to transmit the allocation of parking spaces to at least one video unit located at the parking lot.

Example embodiments of the invention, solve the problem of how to represent uncompressed, live stream video data over low bandwidth communication links. Example low bandwidth communication links may have a data rate as low as a few Kilo bytes/sec. A video unit includes video frame processing logic that processes uncompressed, live stream video data to identify an event occurring in a space to be monitored. The video unit is configured to encode a low bandwidth message characterizing the identified event and to transmit the low bandwidth event message to a management controller over low bandwidth communication links.

FIG. 1A illustrates an example embodiment of the invention, wherein a parking management system comprises a parking lot management controller 120 (also referred to as a parking facility management controller), which allocates parking spaces at a parking lot 100 (also referred to as a parking facility). The parking lot 100 may be an outdoor lot, a parking garage, or multiple parking garages. The parking lot management controller 120 includes a processor 122 comprising a dual central processor unit (CPU) or multi-CPU 124/125, a random access memory (RAM) 126 and read only memory (ROM) 128. The memories 126 and/or 128 include computer program code, including parking lot management software 130(A), configured to cause the management controller 120 to allocate parking spaces at the parking lot 100, based on an initial allocation plan. The parking lot management software 130(A) includes a program to identify expected customers, both previous customers and prepaid customers. The parking lot management software 130(A) also includes a program to learn parking patterns and events and to generate an updated allocation plan for the parking spaces.

The parking lot management controller 120 includes a power line or other low bandwidth communications medium unit 140 that includes a transmit/receive (TX/RX) buffer 142 and a power line or other medium coupler 144, which is configured to turn on various selected combinations of lights 104 via the communications path 104', which may be a power line operated as a low bandwidth communication link, to illuminate parking spaces and aisles throughout the parking lot 100. Other examples of the low bandwidth communication path 104', include twisted pair, coax cable, Ethernet, Infrared, RFID, WiFi, Bluetooth, Bluetooth Low Energy, Sigfox, LTE-M, any Low Power Wireless Area Network (LPWAN) protocol, any machine to machine (M2M) communication protocol, cellular, IEEE 802.15.4 RF, or LoRa Low Power Wide Area Network. Example low bandwidth communication links may have a data rates of a few kilobytes/second. In an alternate embodiment, the parking lot management controller 120 includes a radio communications unit 146 that includes a transmit/receive (TX/RX) buffer 148 a cell phone transceiver and a WiFi transceiver, which are configured to turn on various selected combinations of lights 104 to illuminate parking spaces and aisles throughout the parking lot 100. The power line communications unit 140 is also coupled to a plurality of video units 102(1), 102(2), 102(3), and 102(4) located throughout the parking lot 100, to transmit the allocation of parking spaces to them over power line communications path 102', which may be a power line operated as a low bandwidth communication link. Other examples of the low bandwidth communication path 102', include twisted pair, coax cable, Ethernet, radio media such s WiFi, Bluetooth, cellular, IEEE 802.15.4 RF at longer distances, and LoRa Low Power Wide Area Network. Example low bandwidth communication links may have a data rates of a few kilobytes/second. A sensor 106 near the entrance to the parking lot, is connected to the parking lot management controller 120, to sense the approach of a car to the entrance. A video unit 102(5) near the entrance to the parking lot, is configured to receive a signal from the sensor 106 indicating the approach of a car, to enable the video unit 102(5) to capture the number on the license plate of the car, or a windshield or bumper sticker, to identify previous customers and prepaid customers. A gate 108 at the entrance to the parking lot, dispenses parking tokens to cars entering the parking lot 100. The power line 102' and the power line 104' may be connected to the management controller 120 through separate power line communication units.

FIG. 1B illustrates an example embodiment of the invention shown in FIG. 1A, wherein numbered parking spaces are shown in three rows: 1A to 8A, 1B to 8B, and 1C to 8C. The parking spaces are allocated according to at least one of customer reserved spaces, handicap spaces ("H"), electric vehicle ("EV") station spaces, or unreserved spaces. The parking lot management software 130(B) includes a program to receive and process a text, email or app message from a customer requesting a parking space. The parking lot management software 130(B) also includes a program to receive messages from the customer, which provide information on real time traffic delays to provide an estimate of the best arrival time (from Google maps, Waze traffic information, etc.). Or the management software can get the current vehicle location coordinates and query Google maps, Waze, etc. for arrival times based on what Google maps or other applications might know about traffic, road and weather conditions.

Figure 1C:
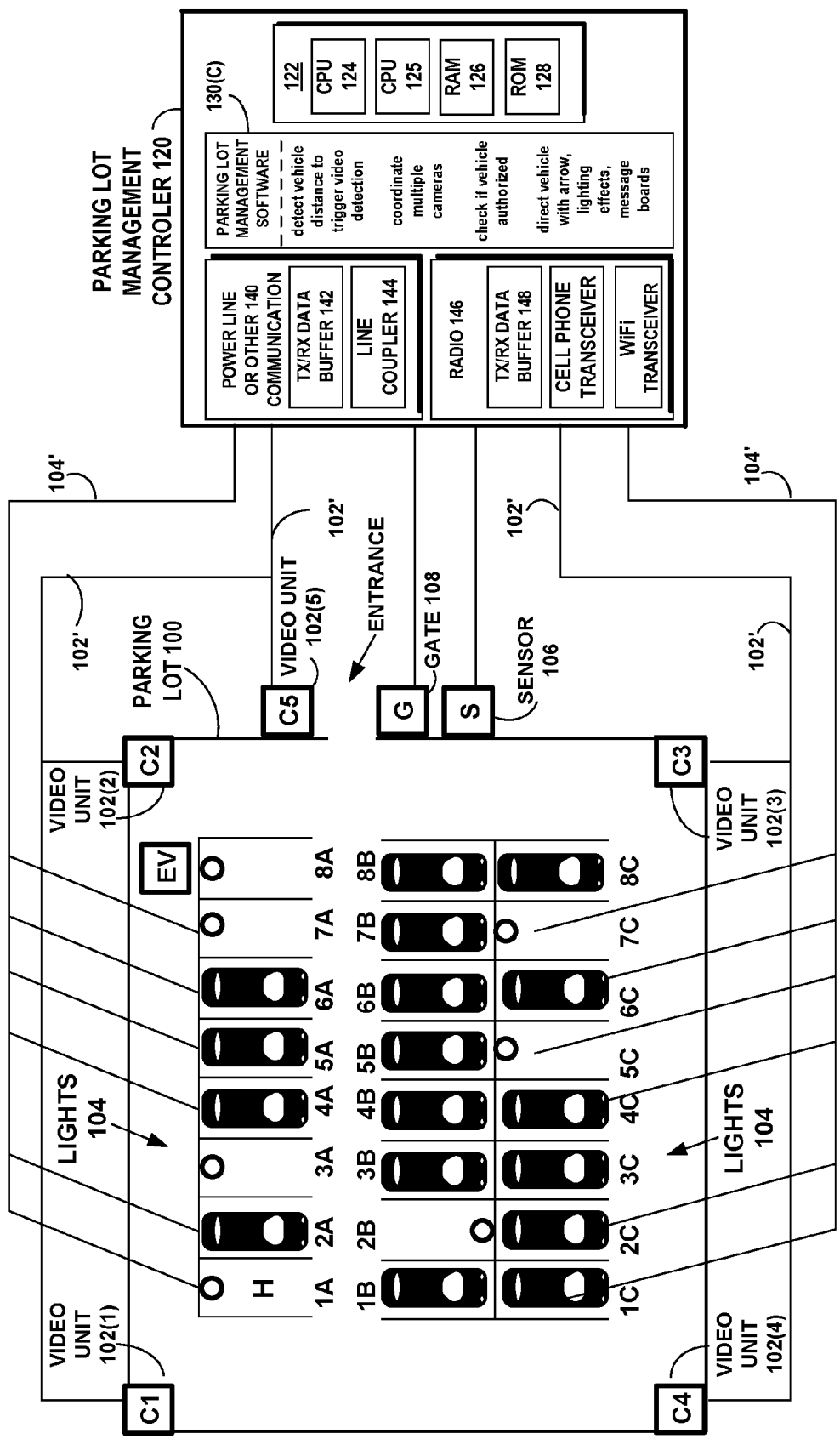
FIG. 1C illustrates an example embodiment of the invention shown in FIG. 1B, wherein a communications unit is included in the management controller, configured to turn on lights along a path from an entrance of the parking lot to the parking space allocated by the management controller, for a car entering the parking lot.

FIG. 1C illustrates an example embodiment of the invention shown in FIG. 1B, depicting an example occupancy pattern for customers' cars in the parking lot 100. The parking lot management software 130(C) includes a program to check if the car is authorized. The parking lot management software 130(C) includes a program configured to turn on lights 104 along a path from the entrance of the parking lot 100 to the parking space allocated by the management controller 120, for a car entering the parking lot 100. The lights 104 may direct the car with an arrow, with lighting effects, or with message boards.

FIG. 1D illustrates an example embodiment of the invention shown in FIG. 1C, wherein at least one video unit 102(1), 102(2), 102(3), or 102(4) is configured to identify an event of the car moving from its parked position to leave the allocated parking space, and transmit the low bandwidth message over power line or other low bandwidth medium path 102' to the management controller 120 indicating the event. The power line or other low bandwidth medium communications unit 140 in the management controller 120, is configured to turn on lights 104 along a path from the parking space allocated by the management controller 120 to a least congested exit of the parking lot 100, in response to receiving the low bandwidth message indicating that the parked car is leaving the allocated parking space. The parking lot management software 130(D) includes programs configured to store customer's name, company name space number, video tracks, for future analysis, notify the customer via a text message or phone call, of car movement, and/or provide a text message, on-demand to the customer, with a picture of the car and/or the surrounding area.

Figure 2:
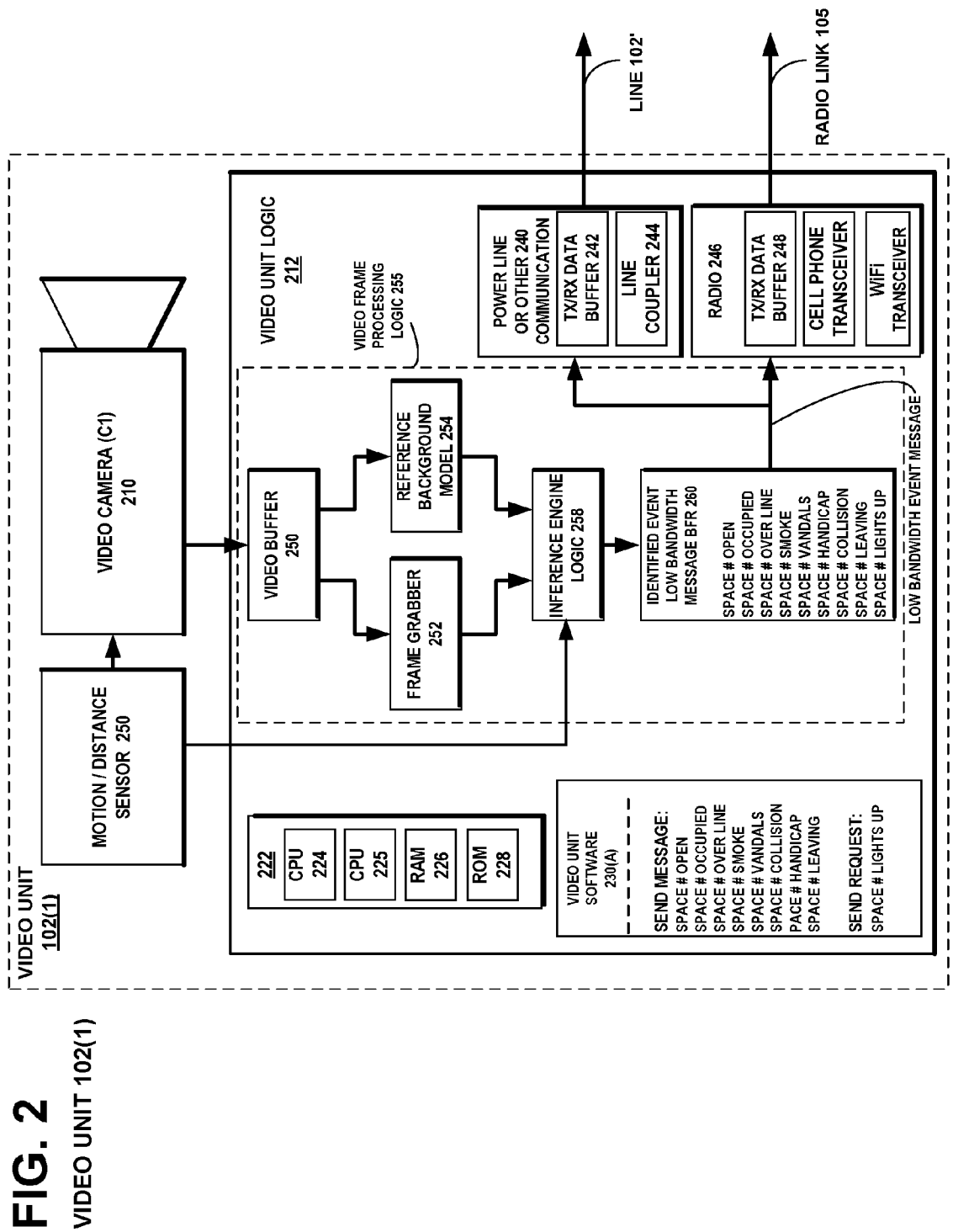
FIG. 2 illustrates an example embodiment of the invention, showing the at least one video unit located at the parking lot, which includes a video camera and video frame processing logic, configured to process a video stream from the video camera while monitoring a parking space allocated by the management controller, identify an event occurring at the allocated parking space. The video unit is configured to encode a low bandwidth message characterizing the event. The video unit includes communications equipment configured to transmit the low bandwidth message to the management controller.

FIG. 2 illustrates an example embodiment of the invention, showing the at least one video unit 102(1) located at the parking lot 100. The video unit 102(1) includes a video camera 210 and video frame processing logic 255 comprising a video buffer 250, frame grabber 252, reference background model 254, and inference engine logic 258. The reference background model 254 is a program construct stored in the RAM 226, which is a learned model that looks at parking background in various lighting, color temperature, shadow and other conditions.

The video frame processing logic 255 processes the video stream from the video camera 210 while monitoring a parking space allocated by the management controller 120, to identify an event occurring at the allocated parking space. The video unit 102(1) also includes a motion/distance sensor 250 that senses the motion and distance of objects, such as moving a car in the parking lot 100 and triggers the video camera 210 to turn on. The motion/distance sensor 250 inputs event signals for detected motion and distance to the inference engine logic 258.

The video camera 210 comprises an image sensor plus a 3D sensor, including a red, green, blue (RGB) sensor plus an infrared (IR) sensor.

Figure 2A:
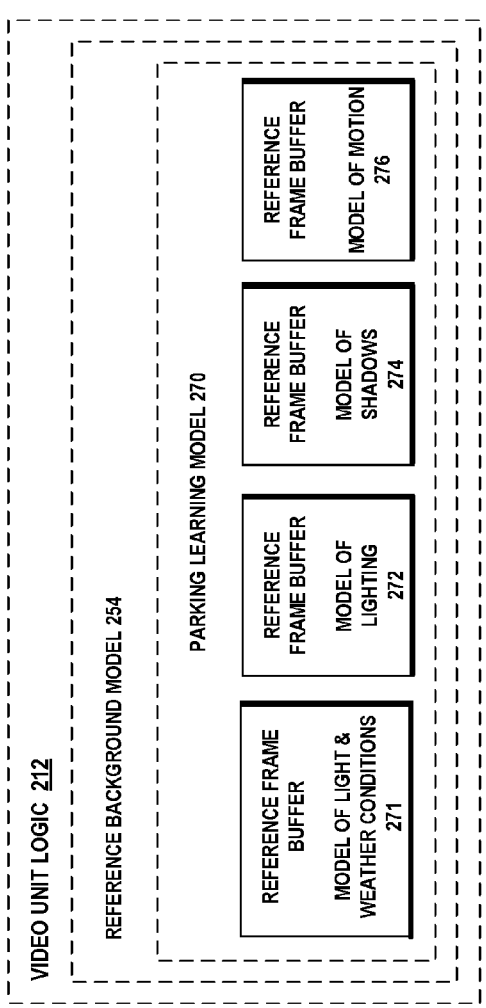
FIG. 2A illustrates an example embodiment of a reference background model in the at least one video unit.

The reference background model 254 shown in FIG. 2A, includes a parking learning model 270 which includes, but is not limited to, multiple reference frame buffers for different light and weather conditions 271, a model of lighting 272, a model of shadows 274, and a model of motion 276.

For example, the model of light and weather conditions 271 takes as an input, the current time of day and the level of solar illumination on cloudy versus sunny days. The light and weather model 271 correlates, over time, the background light level illuminating a particular parking space, based on the time of day and the level of solar illumination. The light and weather model 271 assigns a score to various background light levels. For a current time of day and the level of solar illumination, the light and weather model 271 provides the corresponding score to the inference engine 258, as one of the factors used by the inference engine in determining the occurrence of reportable event at the parking space being monitored.

Figure 2B:
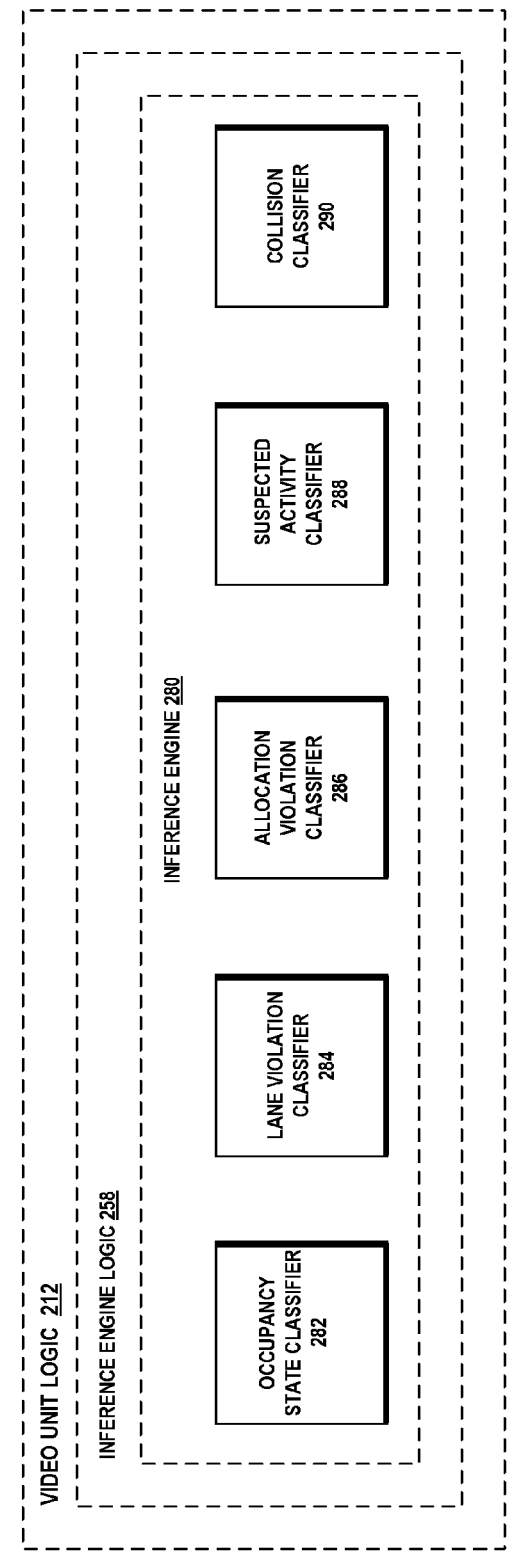
FIG. 2B illustrates an example embodiment of an inference engine logic in the at least one video unit.

The inference engine logic 258 shown in FIG. 2B, comprises an inference engine 280, which includes, but is not limited to, multiple classifiers. Examples of classifiers are: 1. Occupancy state classifier 282; 2. Lane violation classifier 284; 3. Allocation violation classifier 286; 4. Suspected activity classifier 288; and 5. Collision classifier 290. The inference engine logic 258 is a program construct stored in the RAM 226.

For example, the Lane violation classifier 284 applies a sequence of IF-THEN rules to a knowledge base of data, such as the dimensions of a particular parking space and the standards of overlap of lane markers of the parking space, which constitute an encroachment or blocking of the adjacent parking space. The parking learning model factors 270, such as the score received from the light and weather model 271, are used in analyzing the current video frame received from the frame grabber 252, to derive a measurement of the current degree of overlap, if any, of the vehicle currently in the parking space. The measurement of the current degree of overlap is then compared to the dimensions of the particular parking space and the standards of overlap of lane markers of the parking space, using the IF-THEN rules. If the measurement of the current degree of overlap is less than a certain value, then the inference engine logic 258 outputs a "acceptable parking position" indication as the identified event, which is encoded as a low bandwidth event message 402 and transmitted by the video unit 102(1) to the controller 120. Alternately, if the measurement of the current degree of overlap is so great as to block the adjacent parking space, then the inference engine logic 258 outputs a "blocked parking position" indication as the identified event, which is encoded as a low bandwidth event message 402 and transmitted by the video unit 102(1) to the controller 120.

The video unit 102(1) is configured to encode a low bandwidth message characterizing the event. The video unit 102(1) includes a power line or other low bandwidth medium communications unit 240 that includes a transmit/receive (TX/RX) buffer 242 and a power line or other low bandwidth medium coupler 244, configured to transmit the low bandwidth message to the management controller 120 over power line or other low bandwidth medium 102'. In an alternate embodiment, the video unit 102(1) includes a radio unit 246 that includes a transmit/receive (TX/RX) buffer 248, a cell phone transceiver, and a WiFi transceiver, which are configured to transmit the low bandwidth message to the management controller 120 over a radio link 105.

The video unit 102(1) includes a processor 222 comprising a dual central processor unit (CPU) or multi-CPU 224/225, a random access memory (RAM) 226 and read only memory (ROM) 228. The memories 226 and/or 228 include computer program code, including video unit software 230(A). The video unit software 230(A) includes programs: SEND MESSAGE: SPACE # OPEN; SPACE # OCCUPIED; SPACE # OVER LINE; SPACE # SMOKE; SPACE # VANDALS; SPACE # COLLISION; SPACE # HANDICAP; SPACE # LEAVING. The video unit software 230(A) also includes programs such as: SEND REQUEST: SPACE # LIGHTS UP.

The inference engine logic 258 identifies an event occurring at a parking space and outputs the event identity and the identity of the parking space, to the identified event low bandwidth message buffer 260. The identified event low bandwidth message buffer 260 stores a set of short messages of a few octets in length, for example 10 to 20 octets, including a header. The buffer 260 looks up the stored message corresponding the identified event. The buffer 260 adds the identity of the parking space to the message and then transmits the message as a low bandwidth message, over the path 104' to the management controller 120. An example of a set of short messages stored in buffer 260 includes: SPACE # OPEN; SPACE # OCCUPIED; SPACE # OVER LINE; SPACE # SMOKE; SPACE # VANDALS; SPACE # COLLISION; SPACE # HANDICAP; SPACE # LEAVING; and SPACE # LIGHTS UP. The symbol "#" represents the identity of the parking space.

Figure 3A:
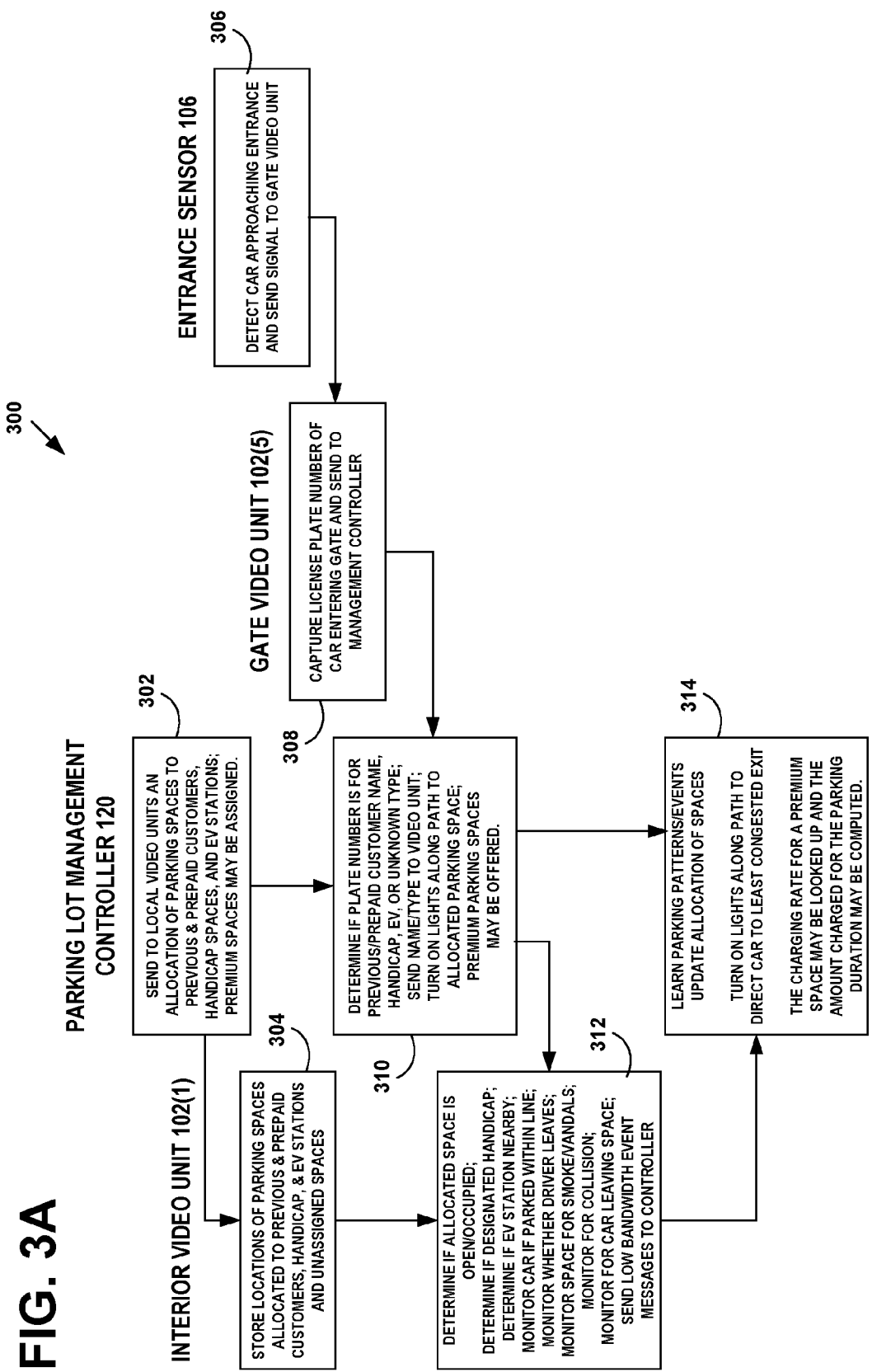
FIG. 3A illustrates an example embodiment of the invention, showing a system flow diagram of an example the operation of the parking management system of FIGS. 1A-1D and FIG. 2.

FIG. 3A illustrates an example embodiment of the invention, showing a system flow diagram of an example the operation of the parking management system of FIGS. 1A-1D and FIG. 2. The flow diagram example steps include the following:

Step 302: parking lot management controller 120: send to local video units an allocation of parking spaces to previous & prepaid customers, handicap spaces, and EV stations. Premium spaces may be assigned.

Step 304: interior video unit 102(1): store locations of parking spaces allocated to previous & prepaid customers, handicap, & EV stations and unassigned spaces.

Step 306: entrance sensor 106: detect car approaching entrance and send signal to gate video unit. Additionally, a picture may be taken and stored as proof of the current condition of the vehicle before it entered the parking structure, for insurance damage claim purposes.

Step 308: gate video unit 102(5): capture license plate number of vehicle, or an identifying number on a windshield sticker etc., upon entering gate, and send to management controller.

Step 310: parking lot management controller 120: determine if plate number is for previous/prepaid customer name, handicap, EV, or unknown type; send name/type to video unit; turn on lights along path to allocated parking space. Premium parking spaces may be offered.

Step 312: interior video unit 102(1): determine if allocated space is open/occupied; determine if designated handicap; determine if EV station nearby; monitor car if parked within line; monitor whether driver leaves; monitor space for smoke/vandals; monitor for collision; monitor for car leaving space; send low bandwidth event messages to controller.

Step 314: parking lot management controller 120: learn parking patterns/events update allocation of spaces; turn on lights along path to direct car to least congested exit. The charging rate for a premium space may be looked up and the amount charged for the parking duration may be computed.

Figure 3B:
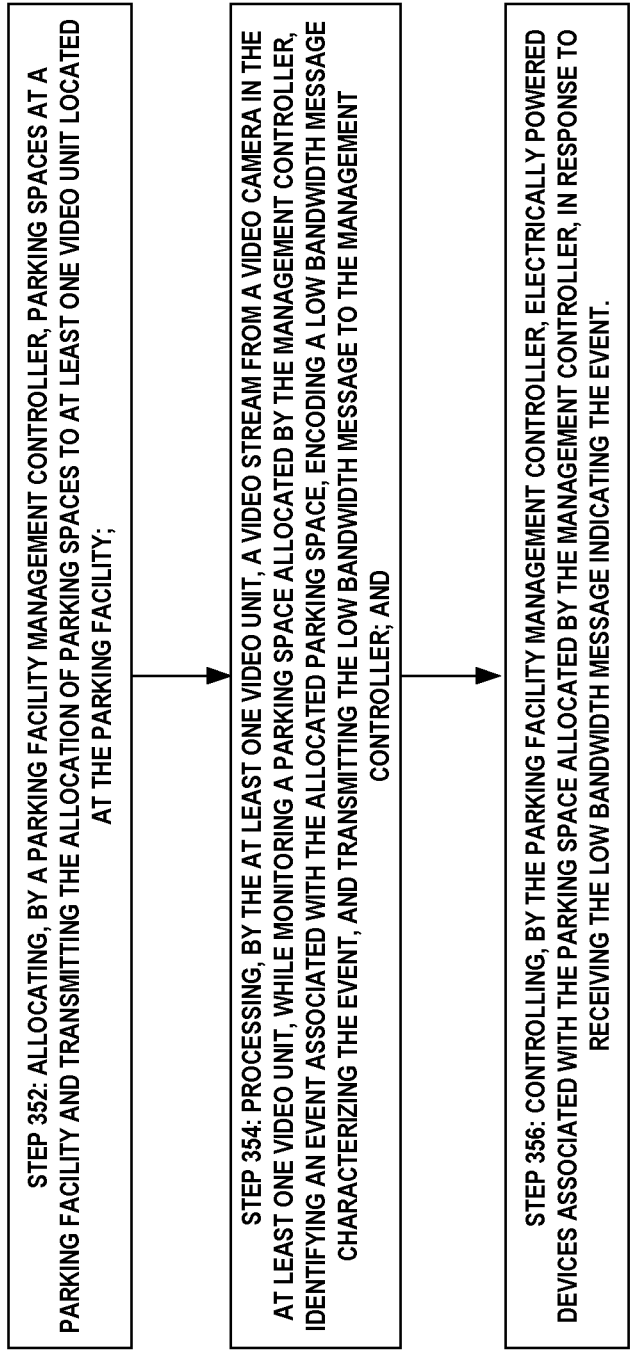
FIG. 3B illustrates an example embodiment of the invention, showing a system flow diagram of an example the operation of the parking management system.

FIG. 3B illustrates an example embodiment of the invention, showing a system flow diagram 350 of an example the operation of the parking management system.

The steps of the flow diagram 350 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 352: allocating, by a parking facility management controller, parking spaces at a parking facility and transmitting the allocation of parking spaces to at least one video unit located at the parking facility;

Step 354: processing, by the at least one video unit, a video stream from a video camera in the at least one video unit, while monitoring a parking space allocated by the management controller, identifying an event associated with the allocated parking space, encoding a low bandwidth message characterizing the event, and transmitting the low bandwidth message to the management controller; and Step 356: controlling, by the parking facility management controller, electrically powered devices associated with the parking space allocated by the management controller, in response to receiving the low bandwidth message indicating the event.

FIG. 4 illustrates a more detailed view of the video unit 102(1) of FIG. 2, wherein an event of the car leaving the parking space is identified as currently occurring at the allocated parking space 2A. The motion/distance sensor 250 senses the motion and distance of the car. The video unit 102(1) is shown encoding a low bandwidth message "SPACE 2A LEAVING" characterizing the event. The video unit 102(1) is shown transmitting the low bandwidth message 402 to the management controller 120.

FIG. 4A illustrates distance and motion sensing for a car at a first position passing space 4C in the parking lot 100. The distance is sensed by sensor 250 located at the C4 video unit 102(4). FIG. 4A' illustrates the low bandwidth event message 402' for the car at the first position of FIG. 4A, the message including the description: "FROM SENSOR AT C4-CAR PASSING 4C".

FIG. 4B illustrates distance and motion sensing for the car at a second position passing space 7C in the parking lot 100. The distance is sensed by sensor 250 located at the C3 video unit 102(3). FIG. 4B' illustrates the low bandwidth event message 402" for the car at the second position of FIG. 4B, the message including the description: "FROM SENSOR AT C3-CAR PASSING 7C".

The parking lot management controller 120 receives the first low bandwidth event message 402' of FIG. 4A' and tracks the car moving past the first position passing space 4C in the parking lot 100. The parking lot management controller 120 then receives the second low bandwidth event message 402" of FIG. 4B' and continues to track the car moving past the second position passing space 7C in the parking lot 100. The parking lot management controller 120 determines from the position of the car with respect to both video units 102(3) and 102(4), as indicated by the event messages 402' and 402", that the car is closer to video unit 102(3), and therefore controller 120 switches its attention from video unit 102(4) to video unit 102(3) to continue tracking the moving car.

Figure 5E:
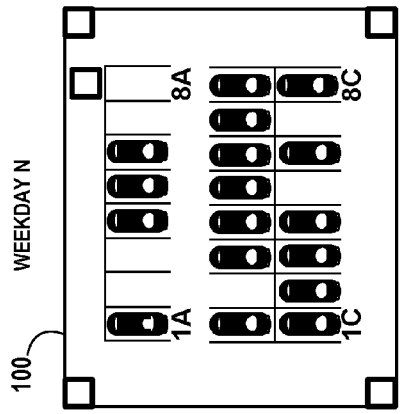
FIGS. 5A to 5F illustrates an example occupancy of the parking spaces in the parking lot over several weekdays and weekends.
Figure 5F:
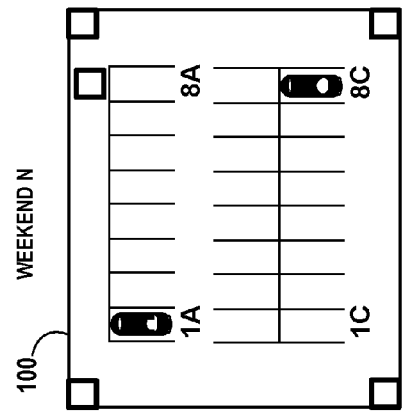
Figure 5C:
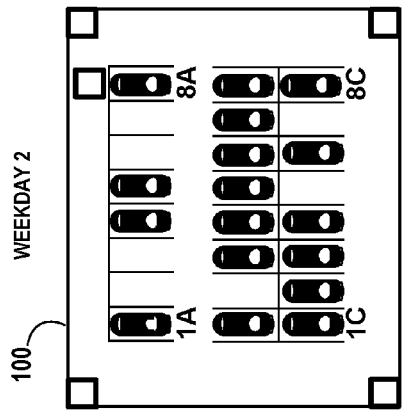
Figure 5D:
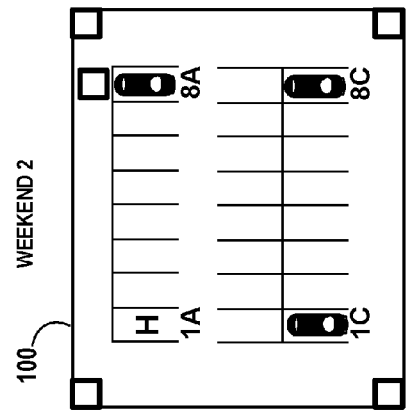
Figure 5A:
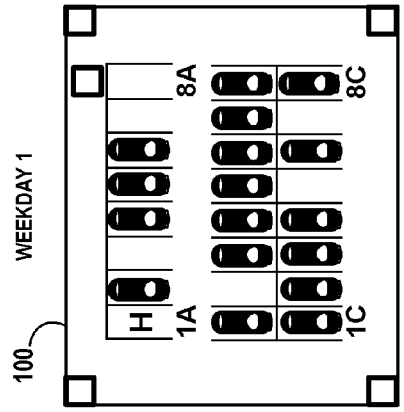
Figure 5B:
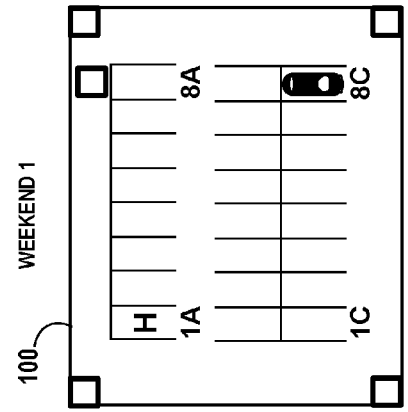

FIGS. 5A to 5F illustrates an example of occupation patterns of the parking spaces in the parking lot 100 over several weekdays and weekends. FIGS. 5A and 5B show the occupation patterns for a first weekday and first weekend. FIGS. 5C and 5D show the occupation patterns for a second weekday and second weekend. FIGS. 5E and 5F show the occupation patterns for an Nth weekday and an Nth weekend.

Figure 6:
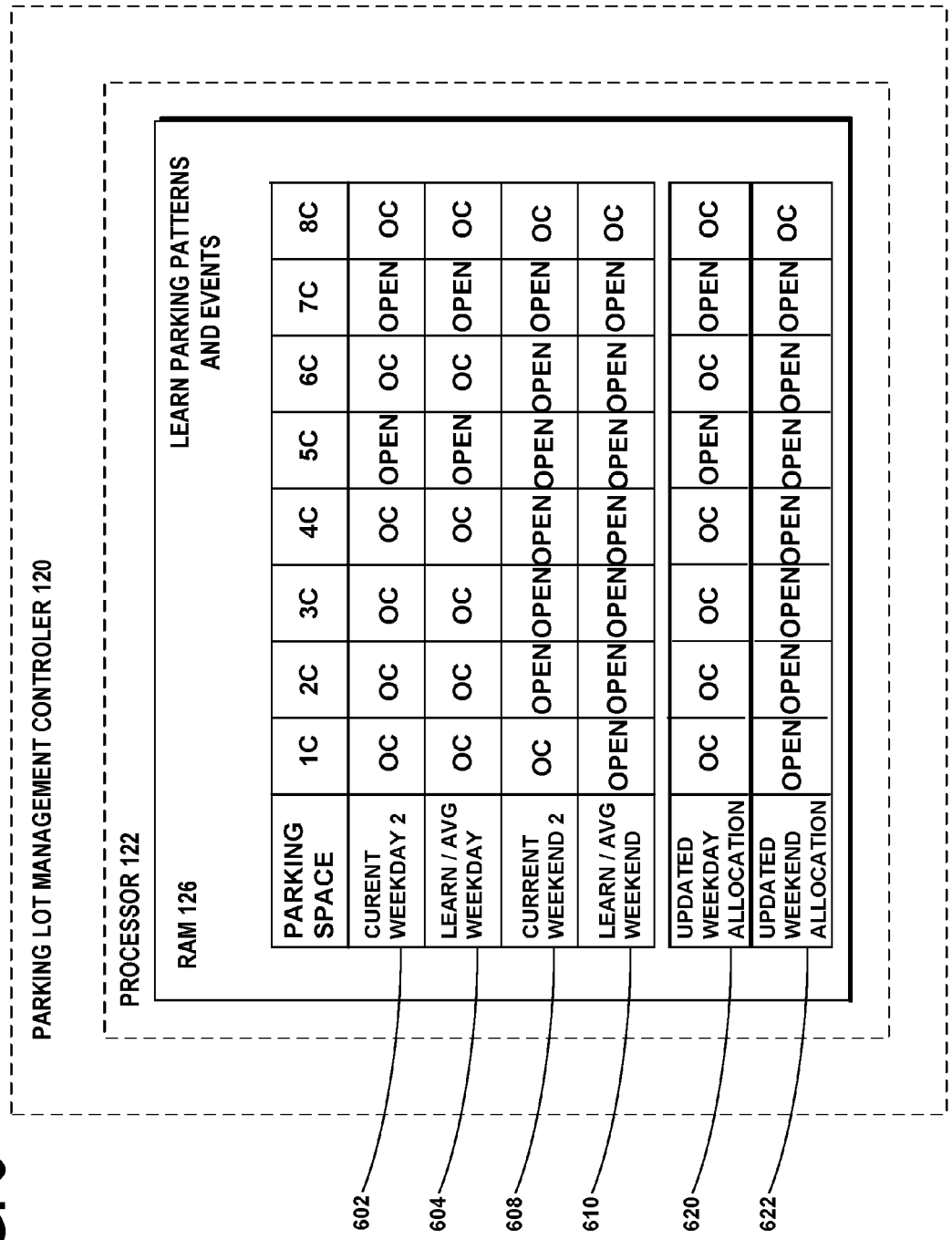
FIG. 6 illustrates an example embodiment of the invention, showing the management controller learning parking patterns of cars parking in the parking lot over time and revising the allocation of parking spaces for at least one of customer reserved spaces, handicap spaces, electric vehicle station spaces, or unreserved spaces in response to learned parking patterns.

FIG. 6 illustrates an example embodiment of the invention, showing the management controller 120 learning parking space occupation patterns of cars parking in the parking lot 100 over time, as shown in FIGS. 5A to 5F. The memory 126 in the management controller 120 is partitioned into registers 602 for current weekday occupation, 604 for average weekday occupation, 608 for current weekend occupation, and 610 for average weekend occupation, which store the occupation patterns of the parking spaces in FIGS. 5A to 5F. The memory 126 in the management controller 120 compiles an updated weekday parking space allocation in register 620 and an updated weekend parking space allocation in register 622. The allocation of parking spaces is updated for at least one of customer reserved spaces, handicap spaces, electric vehicle station spaces, or unreserved spaces in response to learned parking patterns.

Figure 7C:
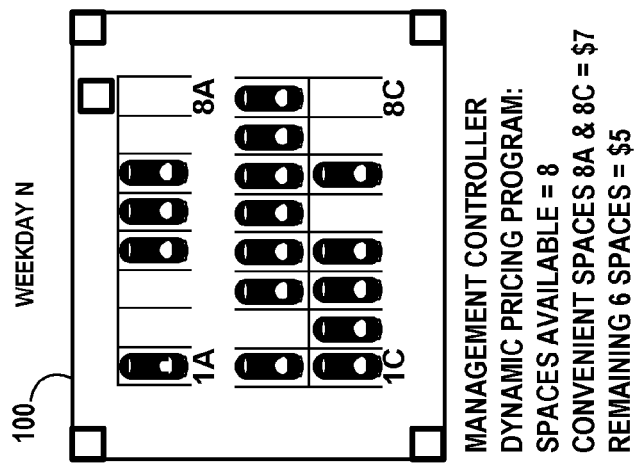
FIGS. 7A, 7B, and 7C illustrate an example embodiment of the invention, showing the programmed management controller performing dynamic pricing of the parking spaces in the parking lot.
Figure 7B:
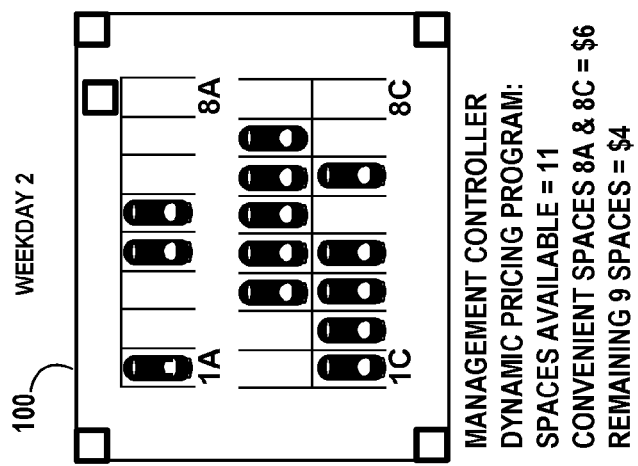
Figure 7A:
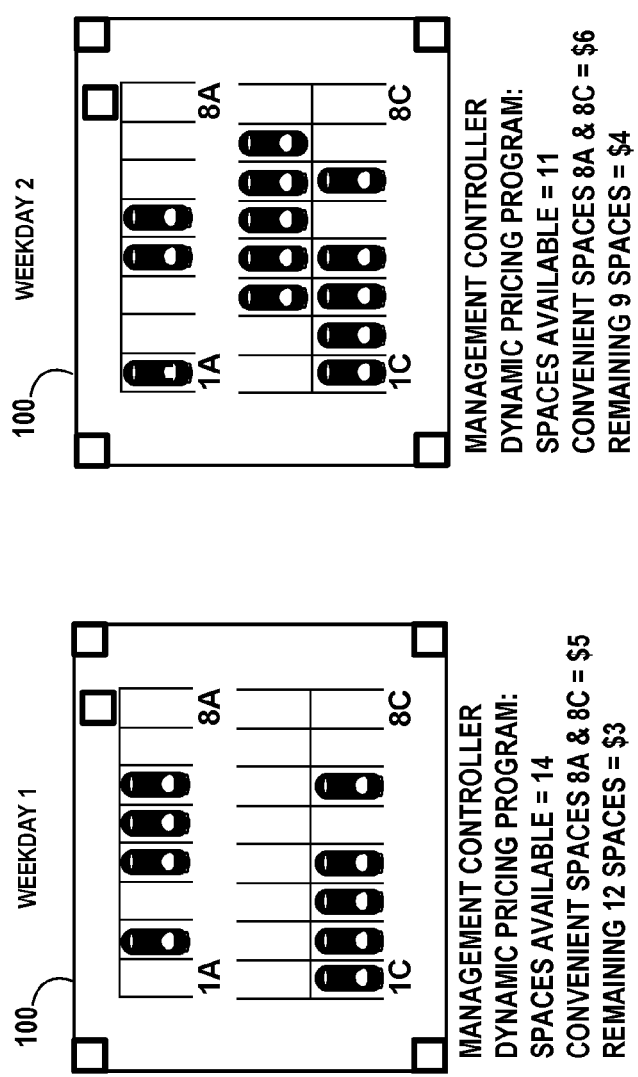

FIGS. 7A, 7B, and 7C illustrate an example embodiment of the invention, showing the management controller 120 performing dynamic pricing of the parking spaces in the parking lot 100. Initially, the management controller may assign premium spaces (step 302 of FIG. 3A). Space under cover from rain or in the shade can command a premium. Or simple capacity could be used to price spaces dynamically. When many spaces are available, such as the 14 spaces shown in FIG. 7A, the programmed controller 120 computes a relatively lower price for the spaces. Spaces 8A and 8C having a more convenient location near the entrance of the lot are priced higher. When fewer spaces are available, such as the 11 spaces shown in FIG. 7B, the programmed controller 120 computes a relatively higher price for the spaces. Spaces 8A and 8C having a more convenient location near the entrance of the lot are priced higher. When still fewer spaces are available, such as the 8 spaces shown in FIG. 7C, the programmed controller 120 computes a relatively higher price for the spaces. Spaces 8A and 8C having a more convenient location near the entrance of the lot are priced higher. Premium parking spaces may be offered by the management controller (step 310 of FIG. 3A). Customers can be billed depending on which space they choose or offered a choice when asking for a reserved spot or at entrance to the parking facility. The charging rate for a premium space may be looked up by the management controller and the amount charged for the parking duration may be computed (step 314 of FIG. 3A).

Although specific example embodiments of the invention have been disclosed, persons of skill in the art will appreciate that changes may be made to the details described for the specific example embodiments, without departing from the spirit and the scope of the invention.

What is claimed is:

1. A parking management system, comprising:
   a parking facility management controller, including a processor and memory including computer program code configured to cause the management controller to allocate parking spaces at a parking facility, the management controller further including a communications unit configured to transmit the allocation of parking spaces to at least one video unit located at the parking facility;
   the at least one video unit located at the parking facility, including a video camera, video frame processing logic, a processor and memory including computer program code configured to cause the video frame processing logic to process a video stream from the video camera while monitoring a parking space allocated by the management controller, a parking learning model in the video frame processing logic, configured to correlate ambient conditions at the monitored parking space over time with current conditions at the monitored parking space and to provide a score of the current conditions to an inference engine logic in the video frame processing logic configured to determine from the score and the video stream, whether a reportable event has occurred associated with the monitored parking space, to identify an event associated with the allocated parking space, and to encode a low bandwidth message characterizing the event, the at least one video unit including a communications unit configured to transmit the low bandwidth message to the management controller; and
   the communications unit included in the management controller, coupled to the at least one video unit and to electrically powered devices in the parking facility, configured to control electrically powered devices associated with the parking space allocated by the management controller, in response to receiving the low bandwidth message indicating the event.

2. The parking management system of claim 1, further comprising:
   the communications unit in the at least one video unit being a power line communications unit configured to transmit the low bandwidth message over installed power lines to the management controller;
   the communications unit in the management controller being a power line communications unit, configured to receive the low bandwidth message over installed power lines from the at least one video unit; and
   the power line communications unit in the management controller further configured to transmit or receive data communications over installed power lines to electrically powered devices in the parking facility where power is needed and control desired.

3. The parking management system of claim 1, further comprising:
   the communications unit in the at least one video unit being configured to transmit the low bandwidth message to the management controller over a communications medium selected from the group consisting of twisted pair, coax cable, Ethernet, Infrared, RFID, WiFi, Bluetooth, Bluetooth Low Energy, Sigfox, LTE-M, Low Power Wireless Area Network (LPWAN) protocol, machine to machine (M2M) communication protocol, cellular, IEEE 802.15.4 RF, or LoRa Low Power Wide Area Network;

the communications unit in the management controller being configured to receive the low bandwidth message from the at least one video unit over the communications medium; and the communications unit in the management controller further configured to transmit or receive data communications over communications medium to electrically powered devices in the parking facility where power is needed and control desired.

4. The parking management system of claim 1, further comprising:

a sensor located at the at least one video unit, configured to sense distance and motion of a vehicle, the at least one video unit, configured to prepare a low bandwidth message representing the vehicle's position and motion sensed by the sensor; and the parking facility management controller further configured to receive the low bandwidth message and to track the vehicle as it moves in the parking facility.

5. The parking management system of claim 1, further comprising:

a sensor proximate to an entrance of the parking facility, configured to detect an approach of a vehicle and transmit a signal indicating the approaching vehicle;

a video unit located proximate to the entrance of the parking facility, coupled to the sensor and the management controller, configured to capture an identification of the approaching vehicle in response to the signal from the sensor and to transmit the identification to the management controller, the identification being based on at least one of a license plate number or an identifying sticker displayed on the vehicle.

6. The parking management system of claim 1, further comprising:

the management controller further configured to determine if a vehicle entering the parking facility, is at least one of associated with a previous or prepaid customer name, displaying a handicap symbol, displaying an electric vehicle indication, or associated with a new customer; and the communications unit included in the management controller, coupled to lighting devices in the parking facility, configured to turn on lights along a path from an entrance of the parking facility to a parking space allocated by the management controller.

7. The parking management system of claim 1, further comprising:

the at least one video unit further configured to identify the event occurring at the allocated parking space, as the allocated parking space being available or occupied, and to transmit the low bandwidth message to the management controller indicating an identified event of the space being occupied; and the management controller further configured to assign an alternate parking space in the parking facility, in response to receiving the low bandwidth message indicating that the allocated parking space is occupied.

8. The parking management system of claim 1, further comprising:

the at least one video unit further configured to identify the event occurring at the allocated parking space, as a parked vehicle leaving the allocated parking space, and to transmit the low bandwidth message to the management controller indicating the event of the parked vehicle leaving the allocated parking space; and the communications unit included in the management controller, coupled to lighting devices in the parking facility, configured to turn on lights along a path from the parking space allocated by the management controller to a least congested exit of the parking facility, in response to receiving the low bandwidth message indicating that the parked vehicle is leaving the allocated parking space.

9. The parking management system of claim 1, further comprising:

the management controller further configured to learn parking patterns of vehicles parking in the parking facility over time and to revise an allocation of parking spaces for at least one of customer reserved spaces, handicap spaces, electric vehicle station spaces, or unreserved spaces in response to learned parking patterns.

10. The parking management system of claim 1, further comprising:

the management controller configured to perform dynamic pricing of the parking spaces in the parking facility, the pricing being a function of availability and convenience of the spaces.

11. A parking management system, comprising:

a parking facility management controller, including a processor and memory including computer program code configured to cause the management controller to allocate parking spaces at a parking facility as at least one of customer reserved spaces, handicap spaces, electric vehicle station spaces, or unreserved spaces, the management controller further including communications equipment configured to transmit the allocation of parking spaces to at least one video unit located at the parking facility; and the at least one video unit located at the parking facility, including a video camera, video frame processing logic, a processor and memory including computer program code configured to cause the video frame processing logic to process a video stream from the video camera while monitoring a parking space allocated by the management controller, a parking learning model in the video frame processing logic, configured to correlate ambient conditions at the monitored parking space over time with current conditions at the monitored parking space and to provide a score of the current conditions to an inference engine logic in the video frame processing logic configured to determine from the score and the video stream, whether a reportable event has occurred associated with the monitored parking space, to identify an event occurring at the allocated parking space, and encode a low bandwidth message characterizing the event, the at least one video unit including communications equipment configured to transmit the low bandwidth message to the management controller.

12. A method for parking management, comprising:

allocating, by a parking facility management controller, parking spaces at a parking facility and transmitting the allocation of parking spaces to at least one video unit located at the parking facility;

processing, by the at least one video unit, a video stream from a video camera in the at least one video unit, while monitoring a parking space allocated by the management controller, a parking learning model in the at least one video unit, configured to correlate ambient conditions at the monitored parking space over time with current conditions at the monitored parking space and to provide a score of the current conditions to an inference engine logic in the at least one video unit configured to determine from the score and the video stream, whether a reportable event has occurred associated with the monitored parking space identifying an event associated with the allocated parking space, encoding a low bandwidth message characterizing the event, and transmitting the low bandwidth message to the management controller; and controlling, by the parking facility management controller, electrically powered devices associated with the parking space allocated by the management controller, in response to receiving the low bandwidth message indicating the event.

13. The method for parking management of claim 12, further comprising:

determining, by the management controller, if a vehicle entering the parking facility, is at least one of associated with a previous or prepaid customer name, displaying a handicap symbol, displaying an electric vehicle indication, or associated with a new customer; and transmitting, by the management controller, a signal to lighting devices in the parking facility, to turn on lights along a path from an entrance of the parking facility to a parking space allocated by the management controller.

14. The method for parking management of claim 12, further comprising:

identifying, by the at least one video unit, the event occurring at the allocated parking space, as the allocated parking space being available or occupied, and transmitting the low bandwidth message to the management controller indicating an identified event of the space being occupied; and assigning, by the management controller, an alternate parking space in the parking facility, in response to receiving the low bandwidth message indicating that the allocated parking space is occupied.

15. The method for parking management of claim 12, further comprising:

identifying, by the at least one video unit, the event occurring at the allocated parking space, as a parked vehicle leaving the allocated parking space, and transmitting the low bandwidth message to the management controller indicating the event of the parked vehicle leaving the allocated parking space; and transmitting, by the management controller, a signal to lighting devices in the parking facility, to turn on lights along a path from the parking space allocated by the management controller to a least congested exit of the parking facility, in response to receiving the low bandwidth message indicating that the parked vehicle is leaving the allocated parking space.

16. The method for parking management of claim 12, further comprising:

learning, by the management controller, parking patterns of vehicles parking in the parking facility over time and revising an allocation of parking spaces for at least one of customer reserved spaces, handicap spaces, electric vehicle station spaces, or unreserved spaces in response to learned parking patterns.

17. The method for parking management of claim 12, further comprising:

performing, by the management controller, dynamic pricing of the parking spaces in the parking facility, the pricing being a function of availability and convenience of the spaces.

* * * * *